(12) United States Patent
Taniguchi et al.

(10) Patent No.: US 9,350,897 B2
(45) Date of Patent: May 24, 2016

(54) IMAGE PROCESSING DEVICE WHICH INSERTS MARKERS INTO DOCUMENTS

(71) Applicant: KONICA MINOLTA, INC., Chiyoda-ku, Tokyo (JP)

(72) Inventors: Yosuke Taniguchi, Osaka (JP); Takeshi Minami, Amagasaki (JP); Kenichi Takahashi, Osaka-fu (JP); Kenji Matsuhara, Kawanishi (JP); Kaitaku Ozawa, Nishinomiya (JP); Yoshiaki Shibuta, Itami (JP); Atsushi Tamura, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/740,452

(22) Filed: Jun. 16, 2015

(65) Prior Publication Data
US 2015/0365558 A1    Dec. 17, 2015

(30) Foreign Application Priority Data
Jun. 16, 2014 (JP) ................................. 2014-123186

(51) Int. Cl.
  *H04N 1/32* (2006.01)
  *G06K 15/02* (2006.01)
  *G06F 3/12* (2006.01)

(52) U.S. Cl.
  CPC .......... *H04N 1/32267* (2013.01); *G06F 3/1222* (2013.01); *G06F 3/1238* (2013.01); *G06K 15/1889* (2013.01); *H04N 1/32144* (2013.01); *H04N 1/32352* (2013.01); *H04N 2201/0082* (2013.01); *H04N 2201/3269* (2013.01)

(58) Field of Classification Search
None
See application file for complete search history.

(56) References Cited

U.S. PATENT DOCUMENTS

| | | | | |
|---|---|---|---|---|
| 6,694,043 | B2 * | 2/2004 | Seder | G06Q 30/02 358/3.28 |
| 7,746,491 | B2 * | 6/2010 | Ikeda | G06F 3/1204 358/1.15 |
| 8,493,601 | B2 * | 7/2013 | Hull | G06F 17/30876 235/385 |
| 8,661,159 | B2 * | 2/2014 | Nakai | G06F 17/30876 358/1.14 |
| 2002/0164053 | A1 * | 11/2002 | Seder | G06Q 30/02 382/100 |
| 2003/0121006 | A1 * | 6/2003 | Tabata | G06F 17/2229 715/205 |
| 2008/0239363 | A1 | 10/2008 | Ming | |
| 2011/0072272 | A1 * | 3/2011 | Corbin | G06F 21/64 713/176 |
| 2011/0317905 | A1 * | 12/2011 | Sam | G06K 21/64 713/176 |
| 2012/0075491 | A1 * | 3/2012 | Hoarau | G06F 3/1204 348/222.1 |
| 2013/0208007 | A1 | 8/2013 | Kubo et al. | |
| 2015/0200922 | A1 * | 7/2015 | Eschbach | H04L 63/08 358/1.14 |

FOREIGN PATENT DOCUMENTS

| | | |
|---|---|---|
| JP | 2008-289130 A | 11/2008 |
| JP | 2013-164653 A | 8/2013 |

* cited by examiner

*Primary Examiner* — Scott A Rogers
(74) *Attorney, Agent, or Firm* — Buchanan Ingersoll & Rooney PC

(57) ABSTRACT

An image processing device inserts an AR (Augmented Reality) marker in documents. The AR marker is to deliver an air tag which corresponds to the AR marker from an air tag server to a terminal device, when the terminal device which reads the AR marker satisfies deliver conditions. The image processing device identifies the air tag which is to be delivered from among air tags stored in the air tag server. The image processing device acquires the AR marker which corresponds to the air tag which is to be delivered from the air tag server. The image processing device inserts the acquired AR marker into the document.

21 Claims, 16 Drawing Sheets

AIRTAG INFORMATION TABLE

| MARKER ID | AR MARKER | AIRTAG DELIVER CONDITIONS | | | AIR TAG |
|---|---|---|---|---|---|
| | | USER ID | GROUP | ACQUIRABLE TIME | |
| MARKER 1 | | — | PERSONNEL | July 1, 2013 9:00~22:00 | marker1.jpeg |
| MARKER 2 | | 100221 ~100225 | — | June 29, 2013 9:00~17:00 | marker2.gif |
| MARKER 3 | | — | ENGINEERING DEPARTMENT | June 28, 2013 9:00~11:00 | marker3.gif |
| ⋮ | ⋮ | ⋮ | ⋮ | ⋮ | ⋮ |

FIG.4
AIRTAG INFORMATION TABLE
| MARKER ID | AR MARKER | AIRTAG DELIVER CONDITIONS | | | AIR TAG |
| --- | --- | --- | --- | --- | --- |
| | | USER ID | GROUP | ACQUIRABLE TIME | |
| MARKER 1 |  | — | PERSONNEL | July 1, 2013 9:00~22:00 | 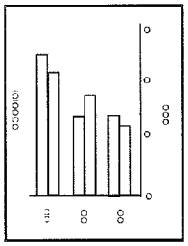 marker1.jpeg |
| MARKER 2 |  | 100221 ~100225 | — | June 29, 2013 9:00~17:00 | 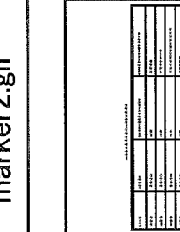 marker2.gif |
| MARKER 3 |  | — | ENGINEERING DEPARTMENT | June 28, 2013 9:00~11:00 | 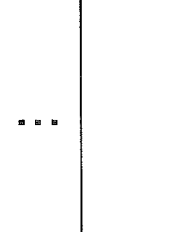 marker3.gif |
| ... | ... | ... | ... | ... | ... |

IMAGE PROCESSING DEVICE WHICH INSERTS MARKERS INTO DOCUMENTS

This application is based on Japanese Patent Application No. 2014-123186 filed with the Japan Patent Office on Jun. 16, 2014, the entire content of which is hereby incorporated by reference.

BACKGROUND OF THE INVENTION

1. Field of the Invention

This invention relates to an image processing device, a control method of an image processing device, and a control program of an image processing device. More specifically, this invention relates to an image processing device, a control method of an image processing device, and a control program of an image processing device which insert a marker into a document.

2. Description of the Related Art

Recently, there is increasing interest in security. Leakage of companies' or individuals' secret information is a matter of serious concern. To deal with this problem, companies may allocate access authority for computerized secret information, or has restrictions on taking the recording media in and out. By adopting such measures using IT (Information Technology) mechanisms, computerized secret information may be guarded to some extent.

Printed papers on which secret information is printed are often distributed as materials to participants, at a conference or a meeting held in companies or organizations. In this instance, it is not easy to prohibit taking out and copying the printed papers on which secret information is printed. Taking out and copying the printed papers by the participants can not be avoided by using the IT mechanism. This causes difficulty on maintaining security.

As for a technique for prevention of secret information leakage from printed papers, a system is proposed. The system delivers secret information as air tags to holders of the printed papers, from an air tag server which performs communication with an image forming apparatus. According to this system, the image forming apparatus prints out papers on which objects that are parts of the documents and contain secret information are replaced with AR (Augmented Reality) markers. An AR marker consists of a QR code (a registered trademark), for example. An AR marker includes information of URL (Uniform Resource Locator) of the air tag server. The holders of the printed papers can not know the secret information by only reading the printed papers themselves. The holders of the printed papers can access the air tag server by making his portable terminal device or his tablet terminal device read the AR marker, so that the air tag server delivers the objects as air tags.

Document 1 below discloses a technique related to an air tag. Document 1 discloses a register apparatus of location related information. The apparatus accesses a geographic information management server which stores both search keywords and the location information connectedly. The apparatus acquires the location information corresponding to the search keyword extracted from contents to be registered. The register apparatus transmits a registration request with contents and the related location information to an air tag information management server. The registration request is to register information which connects the contents and the corresponding location information as the location related information corresponding to the contents, so that the air tag information management server registers air tag information.

Document 2 below discloses a method of electrically storing images of copied documents. According to this method, the stored images can be read and printed again. By this method, physical copies of physical documents are generated. In case that a user uses a copying machine, images of documents are stored in the copying machine. The specific document management information is taken and stored in a document management database. A document management unit in the copying machine or a server connected with the copying machine via a network executes a document management function. The user can select a copied and stored document to print it again.

[Document 1] Japan Patent Publication No. 2013-164653
[Document 2] Japan Patent Publication No. 2008-289130

According to an air tag deliver system, deliver conditions of air tags may be set for each of AR markers, and the settings may be stored in the air tag server beforehand. In this case, the air tag can be delivered only to the user which satisfies the deliver condition. It assures security of air tags.

A user may set deliver conditions of air tags which correspond to objects. The documents on which the objects were replaced with AR markers are printed or delivered by the user. The user may want to use the objects (air tags) for other documents. In this instance, the user should set deliver conditions of air tags again, which are the same conditions as for the previous documents, when the user prints or delivers the new document. In consequence, operations of the user are troublesome and the convenience is hampered.

SUMMARY OF THE INVENTION

This invention is to solve the above problems. The object is to provide an image processing device, a control method of an image processing device, and a control program of an image processing device which can improve convenience.

According to one aspect of this invention, an image processing device which inserts a marker in a document comprising a processor, wherein the marker is for delivering a tag associated with the marker from a server to a terminal device when the terminal device which reads the marker satisfies a deliver condition, the processor is configured to identify a tag to be delivered from among tags stored in the server; acquire a marker associated with the tag to be delivered from the server; and insert the acquired marker into the document.

BRIEF DESCRIPTION OF THE DRAWINGS

FIG. 4 schematically shows the structure of an air tag information table stored in air tag server 200.

DESCRIPTION OF THE PREFERRED EMBODIMENTS

The embodiments of this invention will be explained in the following description, based on the figures.

A Structure of an Air Tag Deliver System

Figure 1:
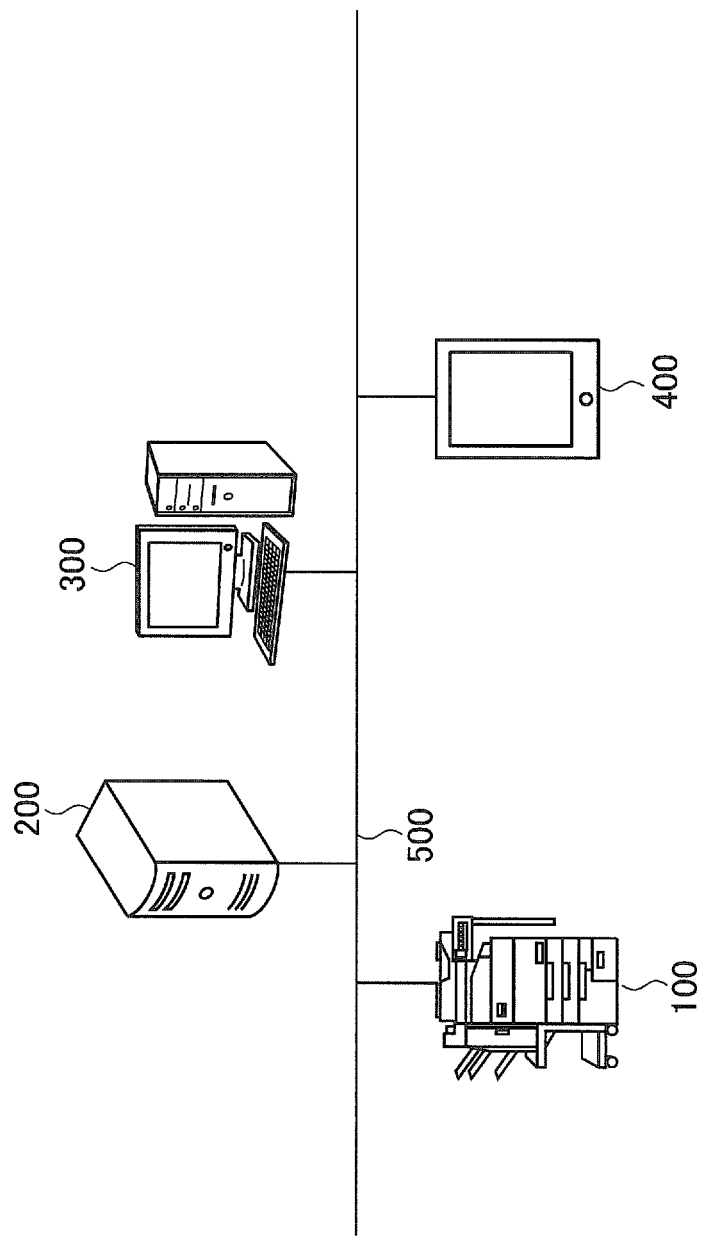
FIG. 1 schematically shows the structure of an air tag deliver system, according to the embodiment of this invention.

FIG. 1 schematically shows the structure of an air tag deliver system, according to the embodiment of this invention.

Referring to FIG. 1, an air tag deliver system according to this embodiment is equipped with image processing device 100, air tag server 200 (an example of a server), PC (Personal Computer) 300, and terminal device 400. Image processing device 100, air tag server 200, PC 300 and terminal device 400 are connected with each other via network 500, and perform communication with each other.

Network 500 uses a private line, for example, a wired or wireless LAN (Local Area Network). Network 500 uses TCP/IP (Transmission Control Protocol/Internet Protocol) to connect various equipments. Equipments connected with network 500 can transmit various data to each other. The air tag deliver system may be equipped with other equipments.

Image processing device 100 is an MFP (Multifunction Peripheral) having a scanner function, a facsimile function, a copying function, a function as a printer, a data transmitting function, and a server function. Image processing device 100 may be a device other than an MFP, for example, an image forming apparatus as a facsimile device, a copying machine, a printer, or the like. Image processing device 100 may be an image reading device as a scanner.

Air tag server 200 may be a PC, a cellular phone, an image processing device (MFP), a smart phone, or the like.

Terminal device 400 should have a function of reading AR markers. Terminal device 400 may be a cellular phone, a smart phone, a wearable display, a camera, or the like.

A user who is a maker of documents operates an operation panel of PC 300 or an image processing device 100 to make image processing device 100 perform jobs (print, deliver, copy, or the like).

In case a user who is a maker of documents instructs image processing device 100 to execute a print job for the documents, image processing device 100 executes the print job based on the instruction and outputs printed papers. Image processing device 100 inserts an AR marker into the documents under certain circumstances, and outputs printed papers of the documents after the insertion of the AR marker.

In case a user who is a maker of documents transmits an instruction to image processing device 100, to execute a job for delivering scanned images of the documents, image processing device 100 executes the job based on the instruction and transmits the scanned images of the documents to terminal device 400 etc. Image processing device 100 inserts an AR marker into the documents under certain circumstances, and delivers the scanned images of the documents after the insertion of the AR marker to terminal device 400 or the like.

A user of terminal device 400 makes his or her own terminal device 400 read the AR marker (an example of a marker) which is included in printed papers or scanned images. Terminal device 400 requests air tag server 200 to transmit an air tag (an example of a tag) associated with the AR marker. Air tag server 200 identifies the user of terminal device 400 based on the ID (Identification) or the like of terminal device 400. When air tag server 200 determines that the user of terminal device 400 satisfies the deliver conditions of the air tag, air tag server 200 delivers the air tag which is associated with the AR marker and includes an object in documents to terminal device 400. In consequence, the user of terminal device 400 can acquire the object which was hidden by the AR marker in the document.

Figure 2:
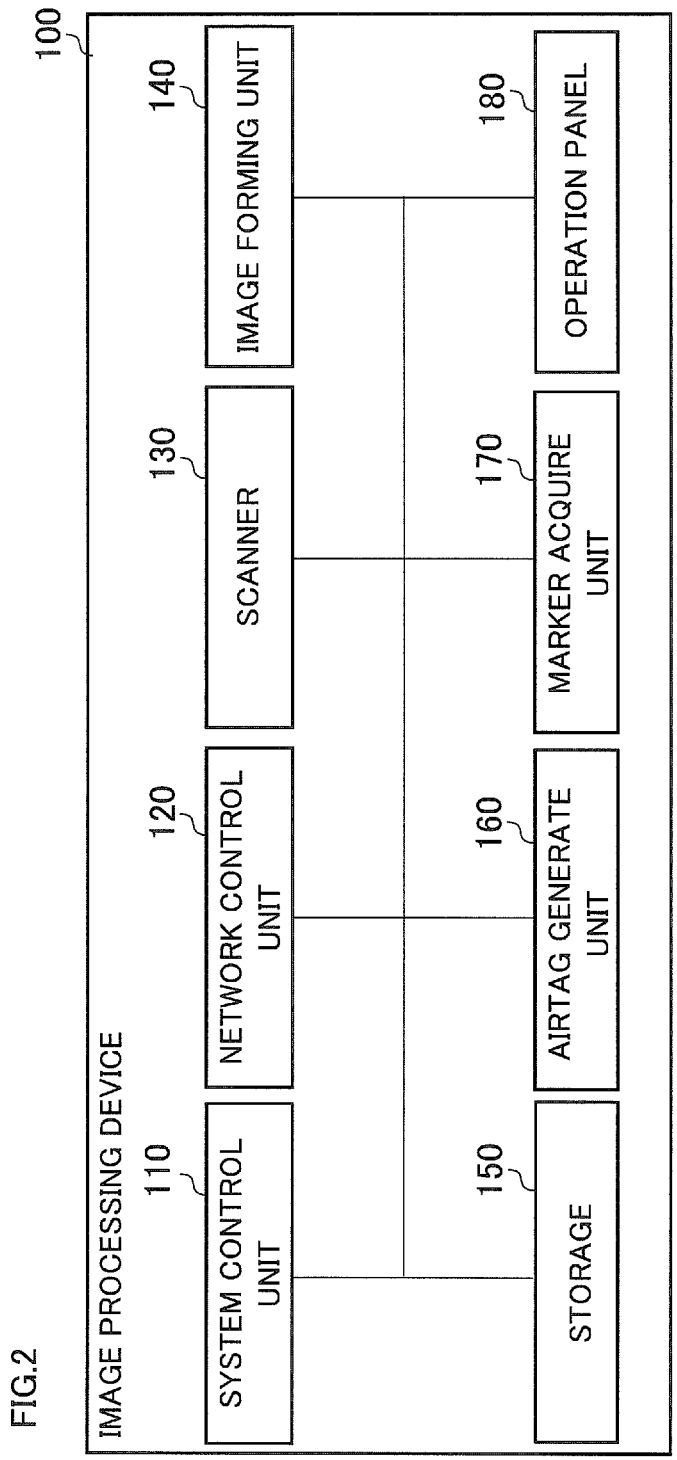
FIG. 2 shows a block diagram of the structure of an image processing device 100.

FIG. 2 shows a block diagram of the structure of image processing device 100.

Referring to FIG. 2, image processing device 100 includes system control unit 110, network control unit 120, scanner 130, image forming unit 140, storage unit 150, air tag generate unit 160, marker acquire unit 170, and operation panel 180. System control unit 110 is connected with each of network control unit 120, scanner 130, image forming unit 140, storage unit 150, air tag generate unit 160, marker acquire unit 170, and operation panel 180.

System control unit 110 controls the entirety of image processing device 100. System control unit 110 includes CPUs (Central Processing Units), ROMs (Read Only Memories), and a RAM (Static Random Access Memory). The CPU executes control programs stored in the ROMs. The ROMs store control programs which control behavior of image processing device 100. The RAM is a memory which is used for working of the CPU.

Network control unit 120 performs communication with external devices via network 500 using a communications protocol of TCP/IP or the like, in accordance with instructions from system control unit 110. When a new AR marker, an air tag, and an air tag deliver condition are generated, network control unit 120 transmits (registers) the new AR marker, the air tag, and the air tag deliver condition to air tag server 200. Further, network control unit 120 acquires information stored in air tag server 200 under certain circumstances.

Scanner 130 generates image data of documents by reading the documents.

Image forming unit 140 executes print jobs. Image forming unit 140 is roughly configured with a toner image forming unit, a fixing device, sheets conveying unit, or the like. Image forming unit 140 forms (prints) images on sheets using electrophotographic technology, for example. Image forming unit 140 mixes 4 colors images by a tandem system and is capable of forming color images on sheets. The toner images forming unit is configured with photo conductors for C (cyan), M (magenta), Y (yellow) and K (black), a secondary transfer belt on which toner images are transferred (the first transfer) from the photo conductors, a transfer unit for transferring images (the second transfer) from the secondary transfer belt to sheets, or the like. The fixing device has a heating roller and a press roller. The fixing device conveys sheets on which toner images are formed, putting the sheets between the heating roller and the press roller. During the conveying, the sheets are heated and pressed. Herewith, the fixing device melts the toner which is adhered to sheets, and fixes it to form images on the sheets. The sheets conveying unit is configured with paper feeding rollers, conveying rollers, motors which drive the rollers, or the like.

The sheets conveying unit feeds sheets from a paper feeding cartridge, and conveys them in a chassis of image processing device 100. The sheets conveying unit discharges sheets on which images were formed from the chassis of image processing device 100 to a copy receiving tray or the like.

Storage unit 150 stores various information.

Air tag generate unit 160 generates an AR marker, an air tag and a air tag deliver condition, when a new AR marker is inserted into documents to be printed.

Operation panel 180 receives various operations and displays various information.

Figure 3:
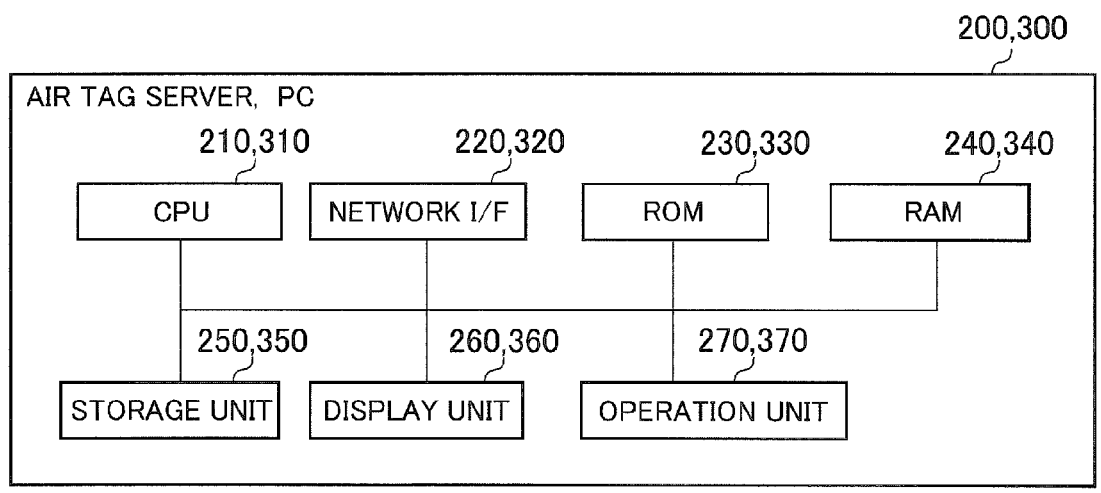
FIG. 3 shows a block diagram of the structure of each of air tag server 200 and PC 300.

FIG. 3 shows a block diagram of the structure of each of air tag server 200 and PC 300.

Referring to FIG. 3, air tag server 200 includes CPU 210 for executing control programs, network I/F 220 which performs communication with external devices via network 500 in accordance with instructions of CPU 210, ROM 230 for storing control programs to control behavior of air tag server 200, RAM 240 which is a working memory for CPU 210, storage unit 250 which stores various information such as an air tag information table, AR markers, air tags, programs of server software (software of a server) or the like, display unit 260 for displaying various information, and operation unit 270 which receives various operations. CPU 210 is connected with each of network I/F 220, ROM 230, RAM 240, storage unit 250, display unit 260, and operation unit 270.

PC 300 has a structure being almost identical to air tag server 200. PC 300 includes CPU 310 for executing control programs, network I/F 320 which performs communication with external devices via network 500 in accordance with instructions of CPU 310, ROM 330 for storing control programs to control behavior of PC 300, RAM 340 which is a working memory for CPU 310, storage unit 350 which stores various information such as document data for jobs, display unit 360 for displaying various information, and operation unit 370 which receives various operations. CPU 310 is connected with each of network I/F 320, ROM 330, RAM 340, storage unit 350, display unit 360, and operation unit 370. Air tag server 200 and PC 300 may have a different structure from each other.

The Structure of an Air Tag Information Table

FIG. 4 schematically shows the structure of an air tag information table stored in air tag server 200.

Referring to FIG. 4, the air tag information table records the correspondence relationship among marker IDs, AR markers, air tag deliver conditions, air tags, or the like. Marker IDs are information for identifying AR markers. An AR marker is for delivering an air tag associated with the AR marker form air tag server 200 to terminal device 400, in case that terminal device 400 which read the AR marker satisfies the deliver condition. An AR marker comprises of a sign associated with an air tag. An AR marker also plays a role as a sign for indicating the location of displaying the air tag. An air tag is information being delivered to terminal device 400, and includes contents of an object in documents. An air tag is associated with an AR marker, by giving the marker ID as the filename of the air tag, for example. Air tags have arbitrary file formats, for example, a document, an image, music, a picture, or the like. Air tags may be assigned with air tag IDs. Air tags may be information which is virtually superimposed on an image taken by a camera.

An air tag deliver condition includes IDs of users who obtain permission for receiving the air tag, groups which obtain permission for receiving the air tag, and time periods (allowed acquiring time periods) during when the air tag is allowed to be delivered. Items for which deliver conditions are not set are filled with "-". Arbitrary conditions may be set for an air tag deliver condition, for example, the age, the sex, the region, or the like.

When receiving a registration request from image processing device 100, air tag server 200 registers new information of correspondence relationship among the marker ID, the AR marker, the air tag deliver condition, the air tag, or the like, on the air tag information table, and stores the new AR marker and the air tag.

According to the air tag information table in FIG. 4, in case a user who is a owner of the printed paper or image data of the document makes terminal device 400 read the AR marker of "MARKER 1", and only when the user belongs to the human resources (personnel) department and the time when the AR marker was read (the time when terminal device 400 requests delivery of the air tag) is between 9:00 and 22:00 on Jul. 1, 2013, air tag server 200 delivers the air tag named "marker1.jpeg" to terminal device 400, for example.

When receiving an instruction of executing a print job of documents or a delivery job for scanned images of documents, image processing device 100 identifies an air tag to be delivered among air tags stored in air tag server 200. Image processing device 100 acquires an AR marker which is associated with the identified air tag from air tag server 200, and inserts the acquired AR marker into the document.

Next, the first to the third behavior examples of the air tag deliver system, when image processing device 100 receives an execute instruction of a print job of documents or a delivery job of scanned images of documents, will be explained. Each of the first to the third behavior examples can be independently performed. The first to the third behavior examples can be performed, combining with each other.

The First Behavior Example of the Air Tag Deliver System

According to the first behavior example, the air tag which is to be delivered is automatically searched (without the user operation) from among air tags stored in air tag server 200 at the side of the air tag deliver system, and identified.

Figure 5:
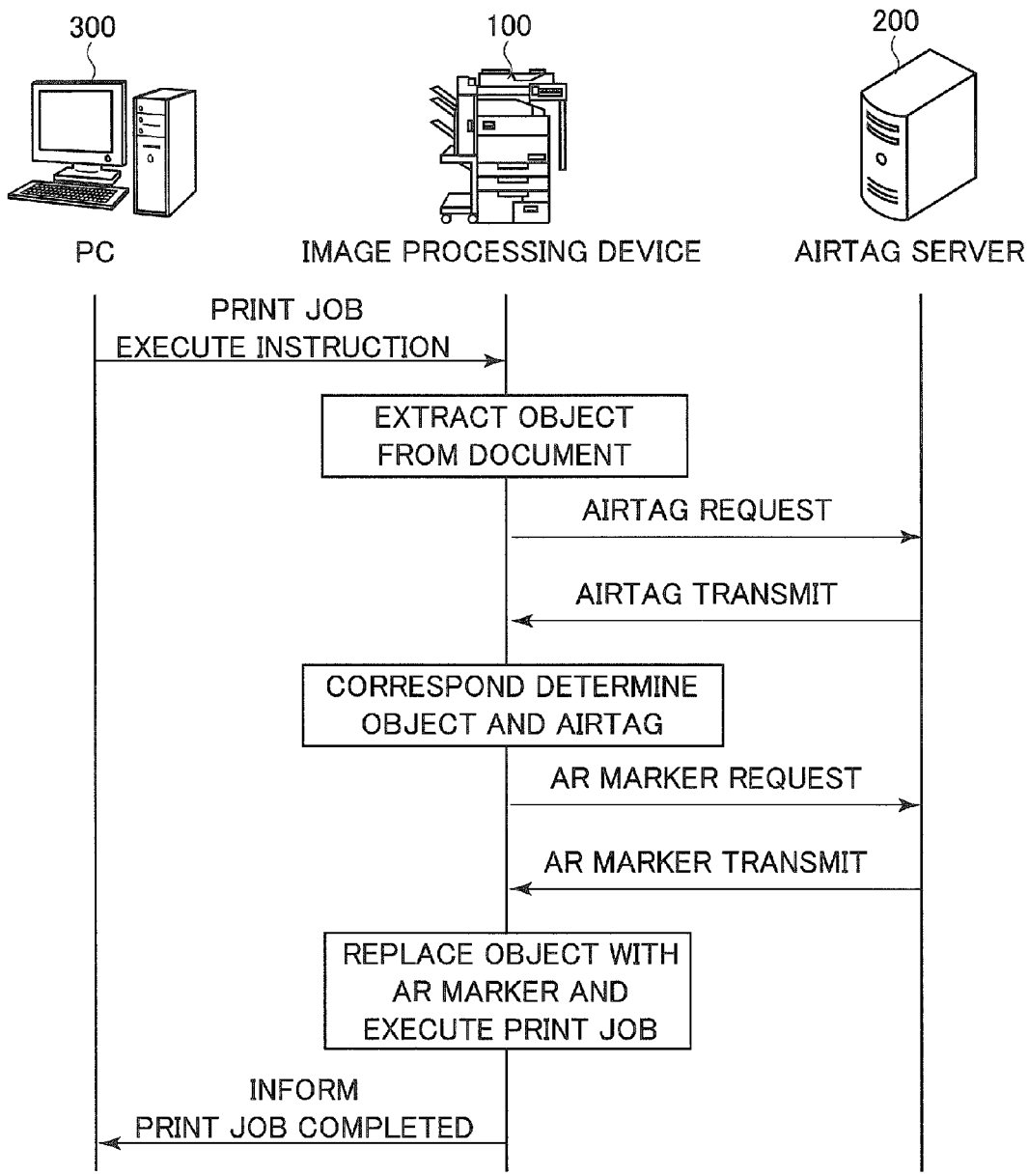
FIG. 5 shows a sequence diagram of the first behavior example of an air tag deliver system.
Figure 6:
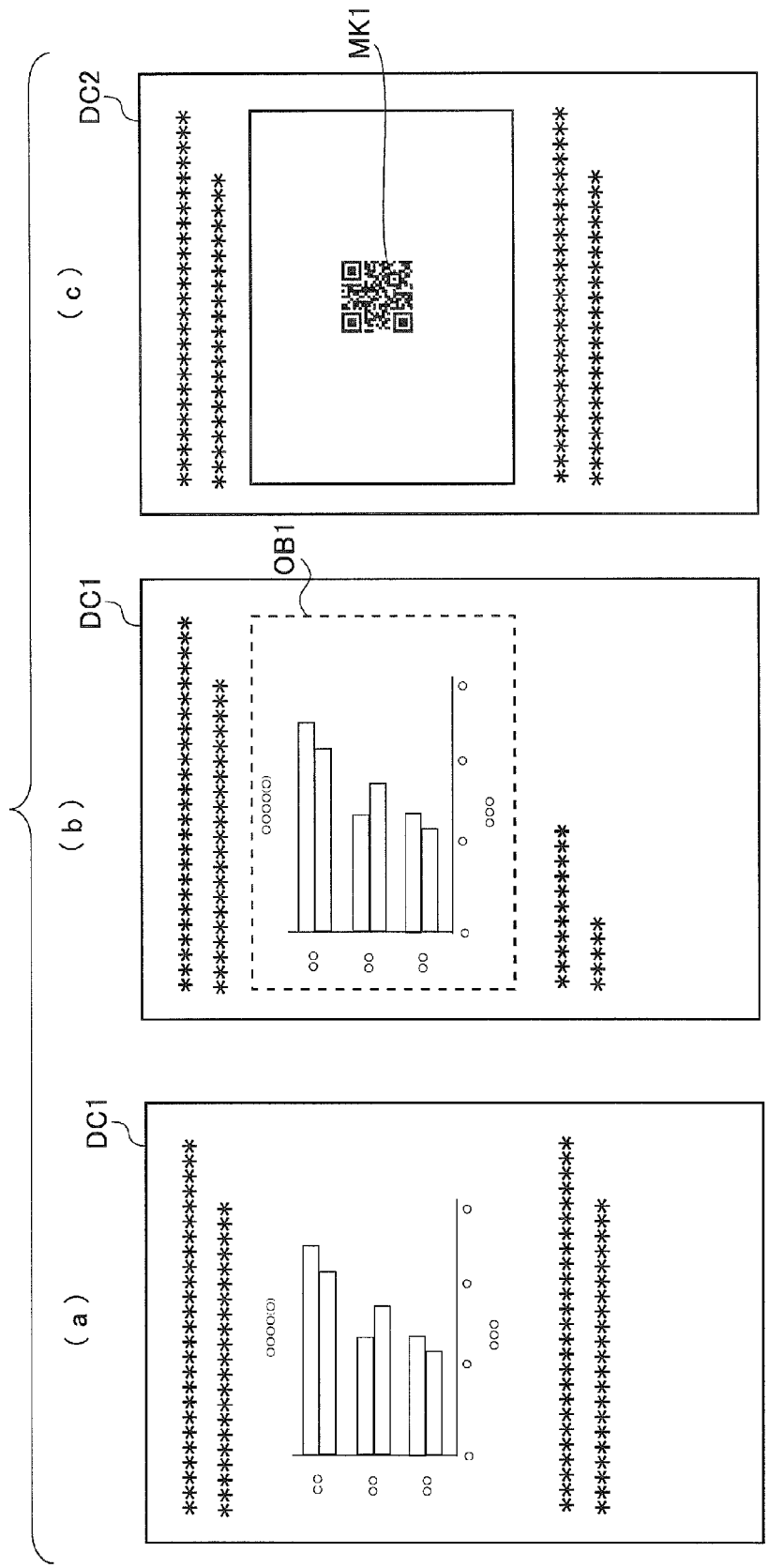
FIG. 6 shows a concept of the first behavior example of an air tag deliver system.

FIG. 5 shows a sequence diagram of the first behavior example of the air tag deliver system. FIG. 6 shows a concept of the first behavior example of the air tag deliver system. In the following Figures, texts in documents are indicated by asterisks.

Referring to FIGS. 5 and 6, a user of PC 300 instructs to execute a print job of document DC1 shown in FIG. 6(a) via PC 300. Image processing device 100 receives the execute instruction of the print job via PC 300. Document DC1 includes texts arranged in the top column and the bottom column, and a graph image arranged in the middle.

Image processing device 100 acquires data of document DC1 which is for the print job from PC 300. Image processing device 100 extracts the graph image area (which is surrounded by dotted lines in FIG. 6(b)) of the graph image, as object OB1 from document DC1, as seen in FIG. 6(b).

The object may be extracted under arbitrary conditions. The contents of the object are arbitrary. Image processing device 100 may virtually divide the document into text areas and image areas, for example, and extract the image areas as objects. Image processing device 100 may extract an area which is drawn in same color as one object in a document. Image processing device 100 may extract an object in the area specified by a user in a document.

Next, image processing device 100 requests air tag server 200 to deliver air tags. Air tag server 200 transmits all registered air tags to image processing device 100, in accordance with the request of image processing device 100.

Image processing device 100 acquires all the air tags which are stored in air tag server 200, and determines the degree of coincidence between object OB1 and each of acquired air tags. In case that there is an air tag which is consistent with object OB1, it means the air tag associated with the object has already been registered in air tag server 200, and the object is replaceable with the registered AR marker. According to this situation, the user who instructed to execute the print job can save the effort of registration of the deliver conditions of the air tag associated with the object, into the air tag server. In this instance, image processing device 100 identifies the air tag which is consistent with object OB1, as the air tag which is to be delivered. Image processing device 100 may identify the air tag which is to be delivered, based on the degree of coincidence.

To determine the degree of coincidence, conventional methods can be used. For example, the method of determining the degree of coincidence by quantifying the degree of similarity using the amount of characteristics such as color, shape, texture, feature points, or the like, can be adopted.

It is supposed that object OB1 corresponds to the air tag named "marker1.jpeg" in FIG. 4. In this instance, image processing device 100 identifies the air tag named "marker1.jpeg" as the air tag to be delivered.

Next, image processing device 100 requests to deliver the AR marker associated with the air tag which is to be delivered. Air tag server 200 transmits the AR marker to image processing device 100, in accordance with the request of image processing device 100.

Here, image processing device 100 acquires the AR marker named "MARKER 1" in FIG. 4. Image processing device 100 replaces object OB1 with acquired AR marker MK1 as seen from FIG. 6(c), and performs the print job for the document DC2 in which the replacement was done. After the completion of the print job, image processing device 100 informs PC 300 that the job was completed.

The job which image processing device 100 accepts in the first behavior example may be a delivery job of scanned images of documents, or other jobs. When image processing device 100 receives an instruction to execute a delivery job of scanned images of documents via operation panel 180, image processing device 100 displays information of completion of the delivery job on operation panel 180. Other than this point, the air tag deliver system performs behavior similar to the above mentioned behavior. In the following description, when a job is simply described, it may mean a print job of documents or a delivery job of scanned images of documents.

"The correspondence determination between an object and an air tag (the extracting an air tag which is the replacement candidate)" may be performed at the air tag server. More specifically, the object extracted by image processing device 100 may be transmitted to the server, and the server performs the correspondence determination of the air tag, for example. The MFP is informed of the result.

Figure 7:
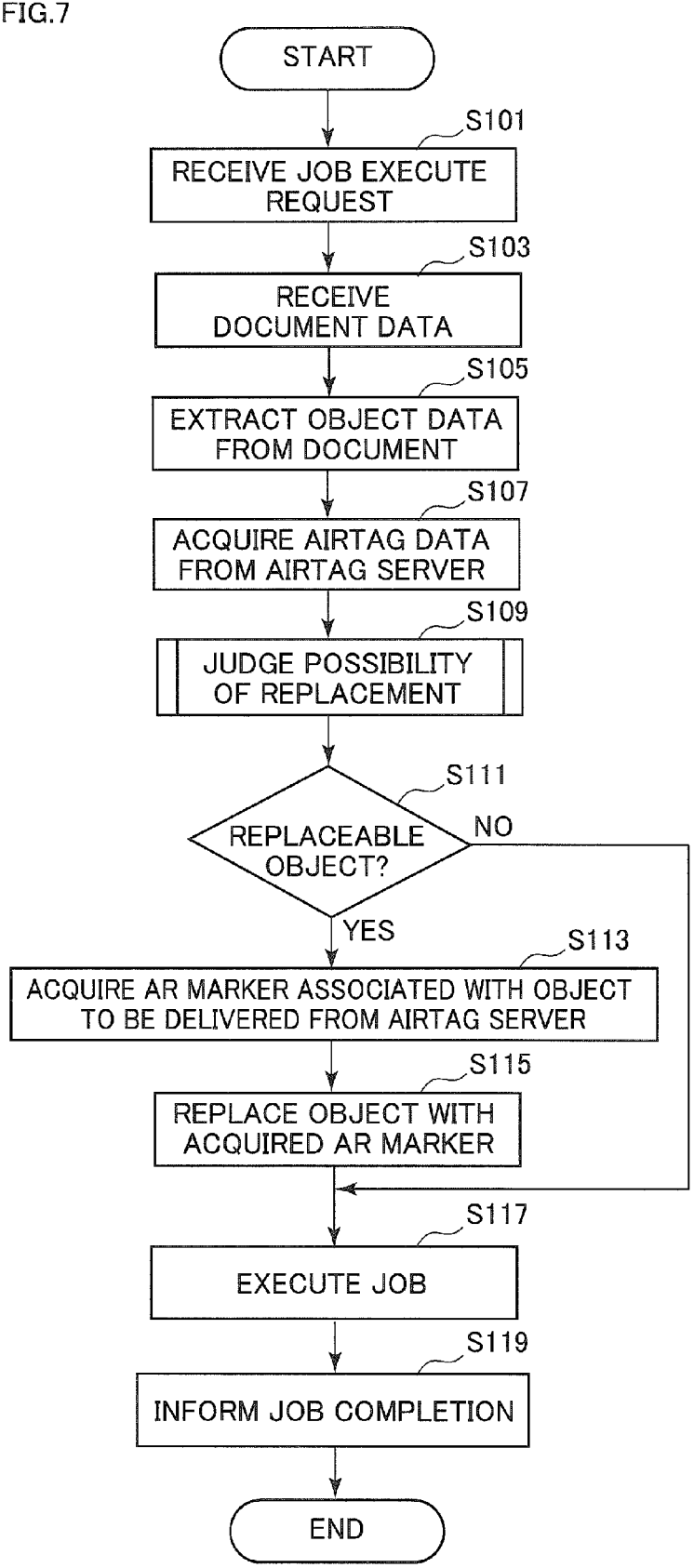
FIG. 7 shows a flowchart of behavior of an image processing device, according to the first behavior example of an air tag deliver system.

FIG. 7 shows a flowchart of behavior of the image processing device, according to the first behavior example of the air tag deliver system.

Referring to FIG. 7, when the CPU of the image processing device receives a job execution instruction and document data for the job (S101, S103), the CPU extracts object data from the document (S105). Next, the CPU acquires air tags data from air tag server (S107), and executes a judgment process of possibility of replacement (S109). Next, the CPU determines whether there is an object which is replaceable with a registered AR marker or not, based on the judgment result of possibility of replacement (S111).

In case that there is an object which is replaceable (YES at S111), the CPU acquires data of the AR marker associated with the air tag which is to be delivered from air tag server (S113). The CPU replaces the replaceable object with the acquired AR marker (S115), and steps in the process of step S117. In case that there is not an object which is replaceable (NO at S111), the CPU steps in the process of step S117.

At step S117, the CPU executes the job for the document after replacement (S117). After that, the CPU informs the completion of the job (S119), and terminates the process.

Figure 8:
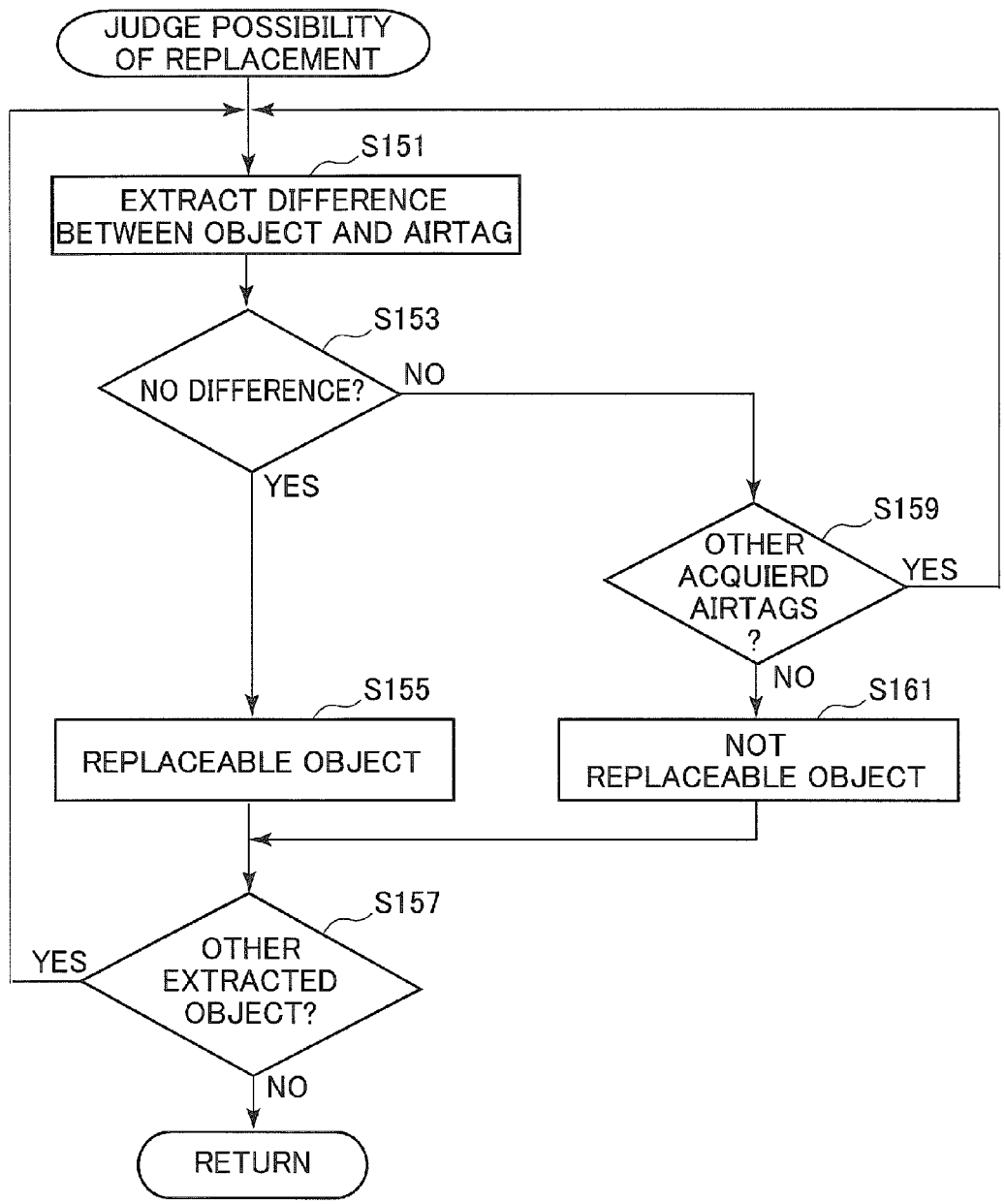
FIG. 8 shows a subroutine of a judgment process of possibility of replacement of step S109 in FIG. 7.

FIG. 8 shows a subroutine of the judgment process of possibility of replacement of step S109 in FIG. 7.

Referring to FIG. 8, at the judgment process of possibility of replacement, the CPU of image processing device 100 determines the degree of coincidence between the object and the air tag (extracts the difference) (S151). Next, the CPU determines whether the object corresponds to the air tag or not (whether there is no difference or not) (S153).

In case that the CPU determines the object corresponds to the air tag (there is no difference) (YES at S153), the CPU determines the object can be replaced with the registered AR marker, and identifies the corresponding air tag as the air tag which is to be delivered (S155). Next, the CPU executes the process of step S157.

In case that the CPU determines the object does not correspond to the air tag (there is difference) (NO at S153), the CPU determines whether there is another air tag which is acquired from the air tag server, or not (S159).

In case that the CPU determines that there is another air tag which is acquired from the air tag server 200 (YES at S159), the CPU proceeds to the process of step S151, and determines the degree of coincidence between the object and the air tag, for the another air tag (S151).

In case that the CPU determines that there is not another air tag which is acquired from the air tag server 200 (NO at S159), the CPU determines that the object can not be replaced with the registered AR markers (S161). Next, the CPU steps in the process of step S157.

At step S157, the CPU determines whether there is another extracted object or not.

In case that the CPU determines that there is another extracted object (YES at S157), the CPU steps in the process of step S151. In case that the CPU determines that there is not another extracted object (NO at S157), the CPU returns to the main routine.

The Second Behavior Example of the Air Tag Deliver System

According to the second behavior example, operations by a user as for insertion of AR markers are partially accepted, and AR markers are partially inserted automatically at the air tag deliver system side.

According to the second behavior example, the air tag which is a candidate for being delivered is searched from among air tags stored in air tag server 200 at the air tag deliver system side, in accordance with the user's request. The air tag which is to be delivered is identified with the approval of the user.

Figure 9:
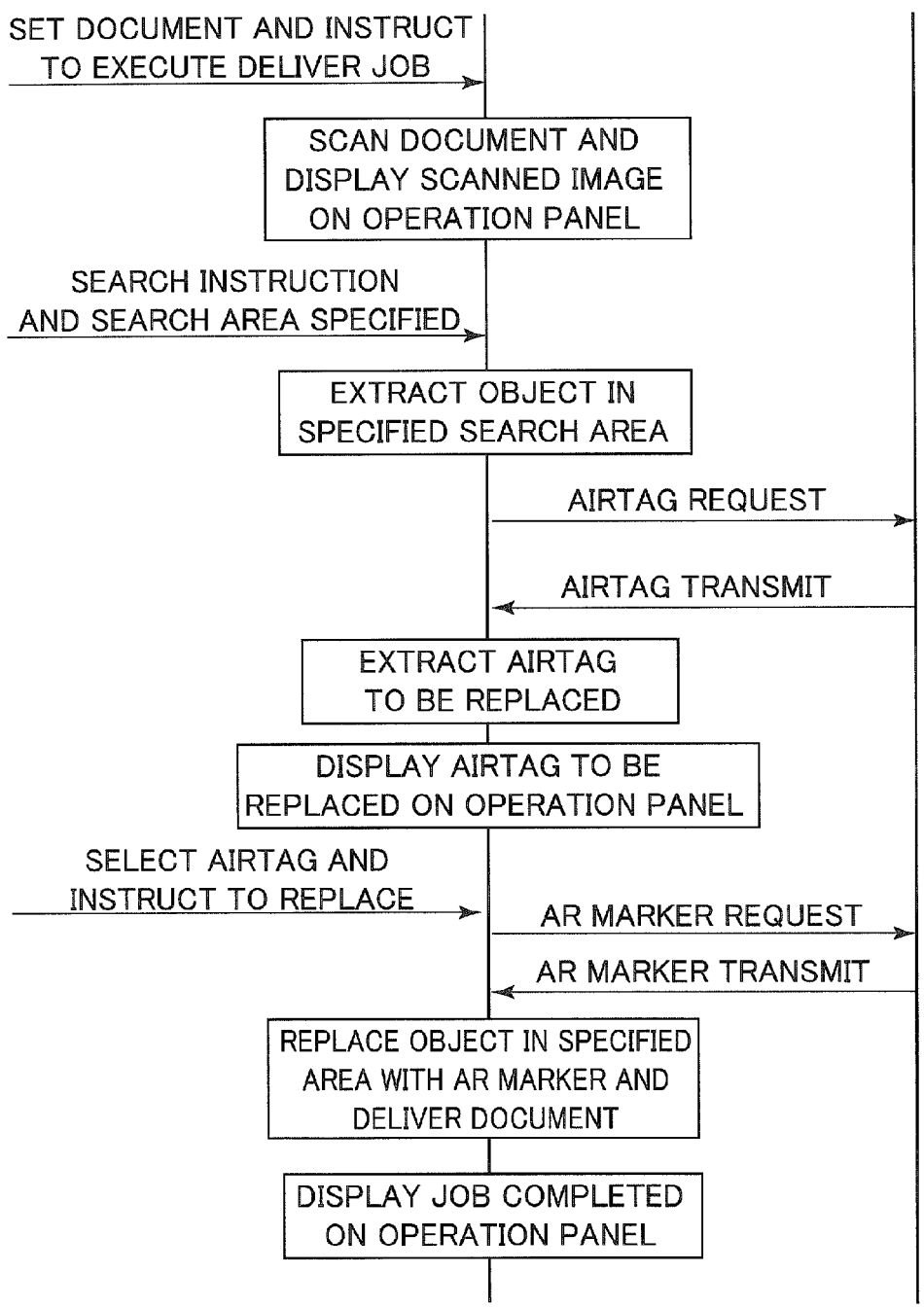
FIG. 9 shows a sequence diagram of the second behavior example of an air tag deliver system.
Figure 10:
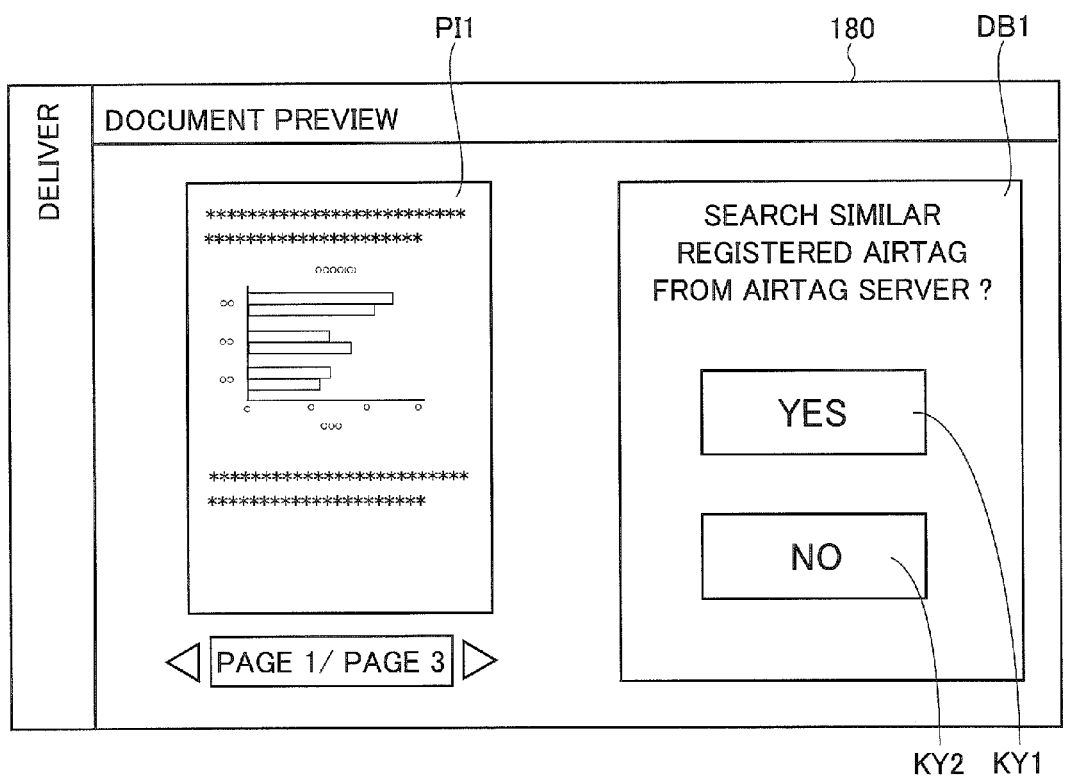
FIG. 10 schematically shows the first screen displayed on operation panel 180 by image processing device 100, according to the second behavior example of an air tag deliver system.
Figure 11:
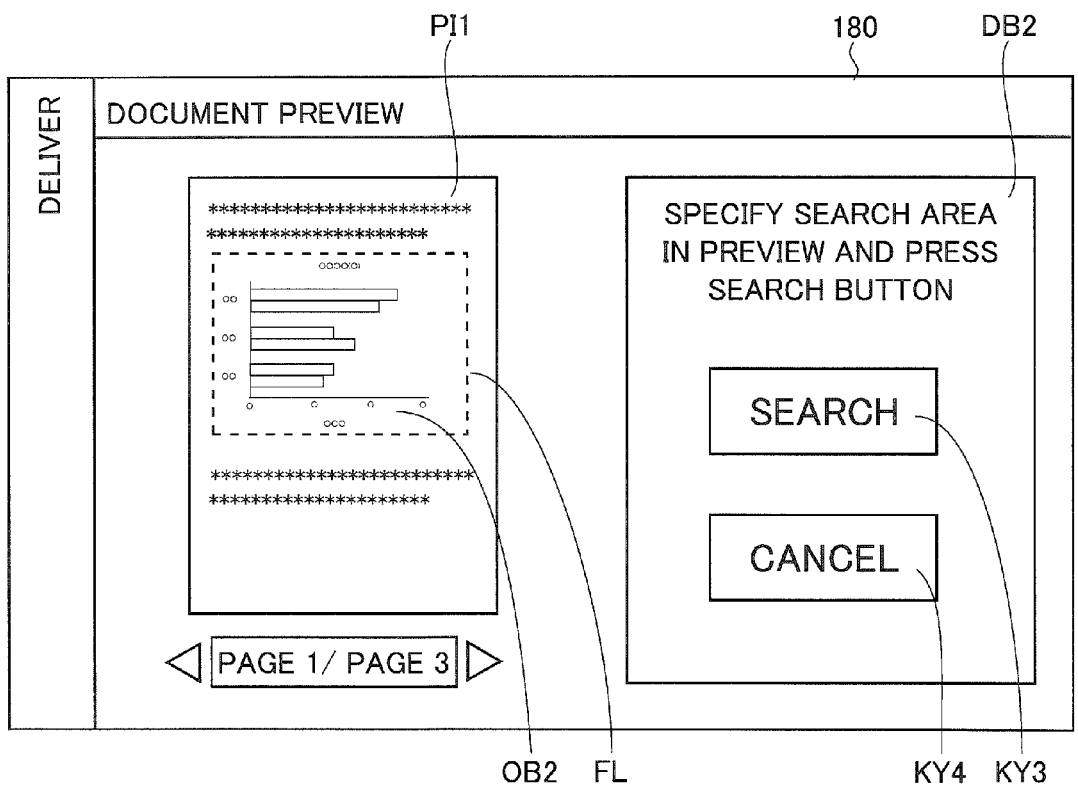
FIG. 11 schematically shows the second screen displayed on operation panel 180 by image processing device 100, according to the second behavior example of an air tag deliver system.
Figure 12:
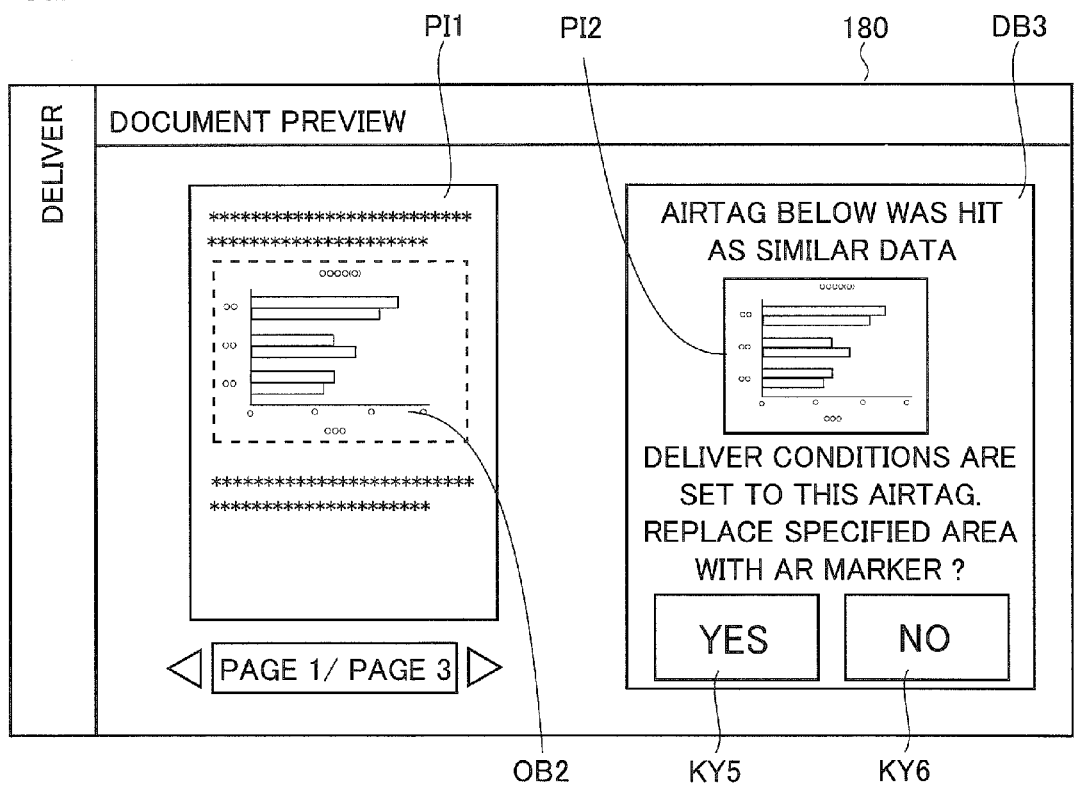
FIG. 12 schematically shows the third screen displayed on operation panel 180 by image processing device 100, according to the second behavior example of an air tag deliver system.

FIG. 9 shows a sequence diagram of the second behavior example of an air tag deliver system. FIGS. 10 to 12 schematically show the screens displayed on operation panel 180 of image processing device 100, according to the second behavior example of an air tag deliver system. In FIGS. 10 to 12, it is assumed that document DC1 is the first page in 3 pages.

Referring to FIGS. 9 and 10, a user of image processing device 100 places the document to image processing device 100, specifies terminal device 400 as the delivery destination, and instructs to execute a delivery job of the scanned image of document DC1. Image processing device 100 scans the placed document when received the execute instruction of the delivery job. Then, the scanned image of document DC1 is generated. Image processing device 100 displays dialog box DB1 with preview image PI1 of the scanned image on operation panel 180. Dialog box DB1 includes messages for inquiring whether registered air tags should be searched from the air tag server or not, "YES" key KY1 for the search instruction, and "NO" key KY2 for the deliver instruction of the scanned image without the search.

Referring to FIGS. 9 and 11, when key KY1 is pressed, image processing device 100 displays dotted frame FL which indicates a search area (an AR marker replace area) in preview image PI1 of the scanned image on operation panel 180. Image processing device 100 also displays dialog box DB2 on operation panel 180. Dialog box DB2 includes messages for inquiring the search area, "Search" key KY3 for receiving a search execution instruction and the search area, and "Cancel" key KY4 for receiving an instruction of returning to the previous screen (FIG. 10).

When key KY3 is pressed, the image processing device extracts object OB2 in the specified search area (dotted frame FL). A plurality of objects may be extracted. Image processing device 100 requests air tag server 300 to transmit air tags, and acquires all the air tags stored in air tag server 200.

Next, image processing device 100 determines the degree of coincidence between object OB2 and each of air tags acquired. Image processing device 100 extracts the air tag similar to object OB2, based on the degree of coincidence. Image processing device 100 may determine that the object and the air tag are similar, in case that the quantitative degree of coincidence is more than or equal to a threshold value (for example, 90%).

Image processing device 100 sets the air tag similar to object OB2, as the air tag (similar data) of a replacement candidate. A plurality of air tags may be set as air tags of the replacement candidates.

Referring to FIGS. 9 and 12, when the air tag as the replacement candidate is set, image processing device 100 informs the user of the air tag as the replacement candidate. Image processing device 100 displays dialog box DB3 with preview image PI1 of the scanned image on operation panel 180. Dialog box DB3 is a screen for selecting the air tag which is to be delivered from among the air tags of the replacement candidates. Dialog box DB3 includes preview image PI2 of the air tags of the replacement candidate, the messages for inquiring whether object OB2 (the search area) should be replaced with the AR marker associated with the air tag of the replacement candidate or not, "YES" key KY5 for receiving the instruction to replace the object with the AR marker associated with the replacement candidate air tag, and "NO" key KY6 for receiving the instruction to do not replace the object with the AR marker associated with the replacement candidate air tag. Here, image processing device 100 sets the air tag named "marker1.jpeg" in FIG. 4 as the replacement candidate air tag.

When "YES" key KY5 is pressed, the air tag associated with the object has already been registered in air tag server 200, and the object can be replaced with the registered AR marker. According to this situation, the user who instructs to execute the job can save the effort of registering deliver conditions of the air tag associated with the object to the air tag server. In this instance, image processing device 100 identifies the air tag of the replacement candidate as the air tag which is to be delivered. Image processing device 100 requests to transmit the AR marker associated with the air tag of the replacement candidate (the AR marker named "MARKER 1" in FIG. 4). Image processing device 100 replaces object OB2 with the AR marker acquired from air tag server 200. Image processing device 100 delivers document DC2 after the replacement to terminal device 400. After the completion of the delivery job of the scanned images, image processing device 100 displays information of the completion of the job on operation panel 180.

When "NO" key KY6 is pressed, the object and the air tag of the replacement candidate are practically different. In this instance, image processing device 100 displays a preview image of the next air tag of the replacement candidate on operation panel 180. In case that "NO" key KY6 is pressed for all the air tags of the replacement candidates, an air tag associated with object OB2 is not registered in air tag server 200, and the object can not be replaced with the registered AR marker. In this instance, image processing device 100 receives settings of deliver conditions of the air tag associated with object OB2 from the user who instructed to execute the delivery job of scanned images.

Jobs which image processing device 100 receives in the second behavior example may be print jobs or other jobs. When image processing device 100 receives an instruction to execute a print job of documents via PC 300, image processing device 100 displays preview images of documents on PC 300, and receives operations of the user via PC 300. Image processing device 100 displays information about the completion of the print job on PC 300. Other than this point, the air tag deliver system performs behavior similar to the above.

"The correspondence determination between an object and an air tag (the extracting an air tag which is the replacement candidate)" may be performed at the air tag server. More specifically, the object extracted by image processing device 100 may be transmitted to the server, and the server performs the correspondence determination of the air tag, for example. The MFP is informed of the result.

Figure 13:
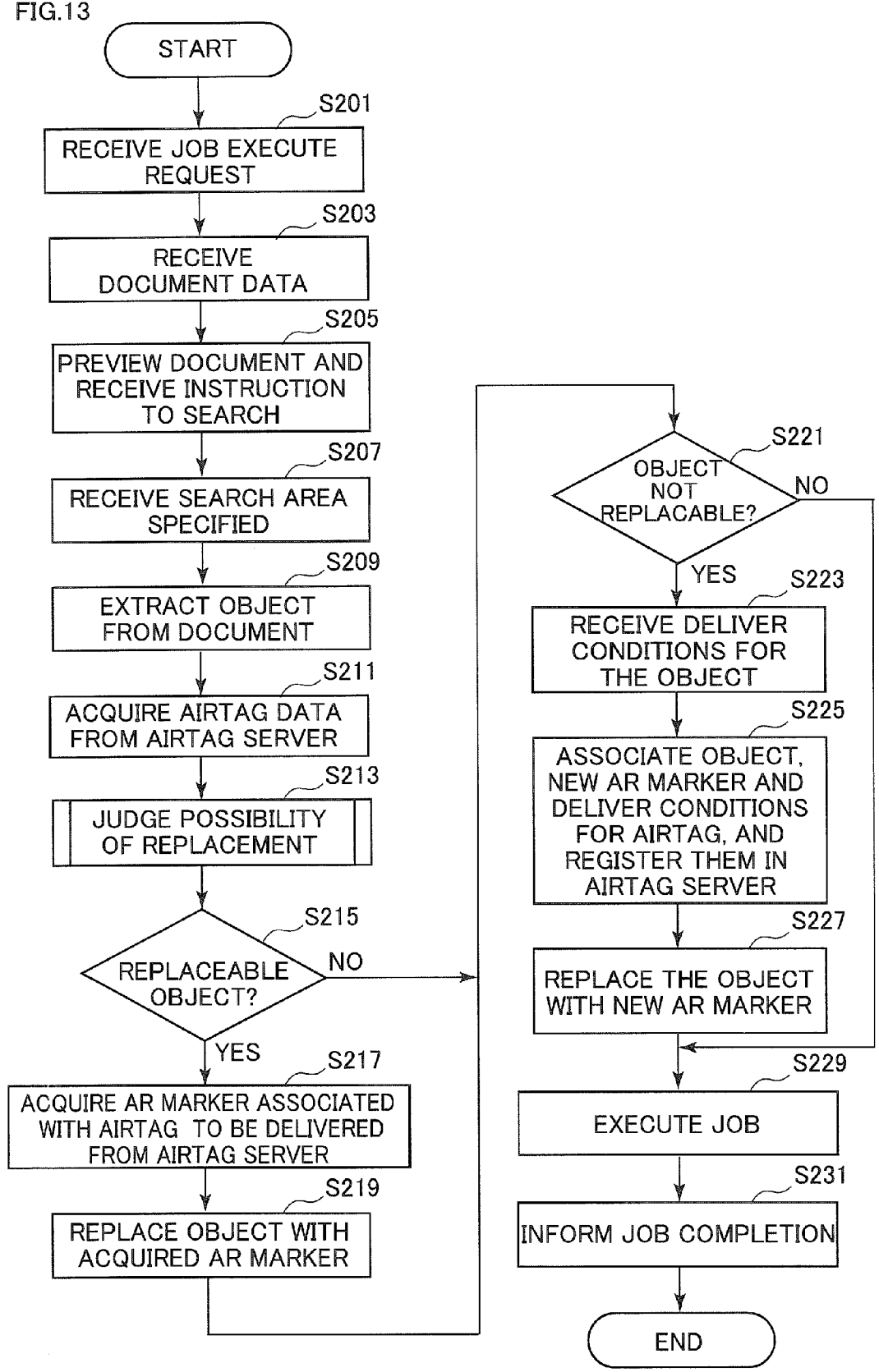
FIG. 13 shows a flowchart of behavior of an image processing device, according to the second behavior example of an air tag deliver system.

FIG. 13 shows a flowchart of behavior of the image processing device, according to the second behavior example of the air tag deliver system.

Referring to FIG. 13, when the CPU of the image processing device receives an instruction of performing a job and document data for the job (S201 and S203), the CPU previews the document images and receives an instruction to execute the search (S205). Next, the CPU receives the specified search area (S207), and extracts the object from the specified search area (S209). The CPU acquires air tag data from the air tag server (S211), and executes a judgment process of possibility of replacement (S213). The CPU determines whether there is the object which is replaceable with the registered AR marker or not, based on the result of the judgment process of the possibility of replacement (S215).

In case that there is the replaceable object (YES at S215), the CPU acquires the AR marker data associated with the air tags which are to be delivered from the air tag server (S217). The CPU replaces the replaceable object with the acquired AR marker (S219), and steps in the process of step S221. In case that there is not the replaceable object (NO at S215), the CPU steps in the process of step S221.

At step S221, the CPU determines whether there is an object which can not be replaced with the registered AR marker or not, based on the result of the judgment process of possibility of replacement (S221).

In case that there is the object which can not be replaced with the registered AR marker (YES at S221), the CPU receives settings of deliver conditions of the air tag for the object which can not be replaced with the registered AR marker (S223). Next, the CPU generates a new AR marker, and registers the object data, the new AR marker, and the air tag deliver conditions, associating with each other in air tag server (S225).

The CPU replaces the object with the new AR marker (S227), and steps in the process of step S229. In case that there is not an object which can not be replaced with the registered AR marker (NO at S221), the CPU steps in the process of step S229.

At step S229, the CPU executes the job for the document after the replacement. The CPU informs the completion of the job (S231), and terminates the process.

Figure 14:
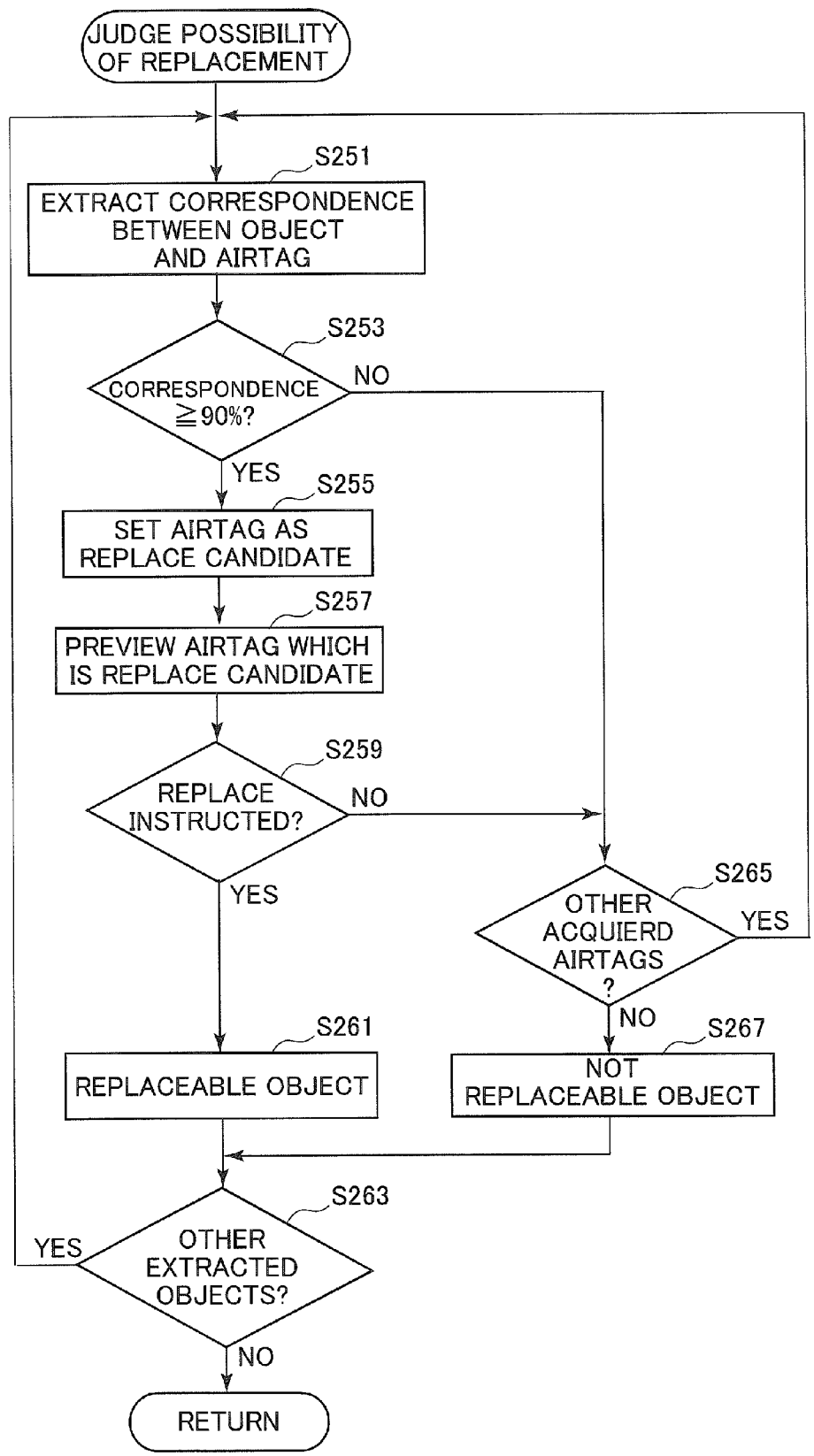
FIG. 14 shows a subroutine of a judgment process of possibility of replacement of step S213 in FIG. 13.

FIG. 14 shows a subroutine of the judgment process of possibility of replacement of step S213 in FIG. 13.

Referring to FIG. 14, in the judgment process of possibility of replacement, the CPU of the image processing device determines (calculates) the degree of coincidence between the object and the air tag (S251). The CPU determines whether the degree of coincidence between the object and the air tag (the degree of coincidence of data) is more than or equal to 90% or not (S253).

In case that the degree of coincidence between the object and the air tag is more than or equal to 90% (YES at S253), the CPU determines that the object and the air tag are similar. In this instance, the CPU sets the air tag as the replacement candidate (S255), and previews the air tag of the replacement candidate (S257). Next, the CPU determines whether an instruction to replace the object with the AR marker associated with the air tag of the replacement candidate is received or not (S259).

In case that the instruction to replace the object is received (YES at S259), the CPU determines that the object can be replaced with the registered AR marker. The CPU identifies the corresponding air tag as the air tag which is to be delivered (S261). Next, the CPU steps in the process of step S263.

In case that the degree of coincidence between the object and the air tag is less than 90% (NO at S253), the CPU determines that the object and the air tag are not similar. In this instance, the CPU steps in the process of step S265.

In case an instruction to replace the object is not received (NO at S259), the CPU determines that the air tag of the replacement candidate does not correspond to the object. In this instance, the CPU steps in the process of step S265.

At step S265, the CPU determines whether there is another air tag acquired from the air tag server or not.

In case that there is another air tag acquired from the air tag server 200 (YES at S265), the CPU proceeds to the process of step S251, and determines the degree of coincidence between the object and the another air tag (S251).

In case that there is not another air tag acquired from the air tag server 200 (NO at S265), the CPU determines that the object can not be replaced with the registered AR marker (S267). Next, the CPU steps in the process of step S263.

At step S263, the CPU determines whether there is another extracted object or not (S263).

In case that there is another extracted object (YES at S263), the CPU steps in the process of step S251. On the other hand, in case that there is not another extracted object (NO at S263), the CPU returns to the main routine.

The Third Behavior Example of the Air Tag Deliver System

According to the third behavior example, the air tag which is to be delivered is identified in accordance with an input of a user.

Figure 15:
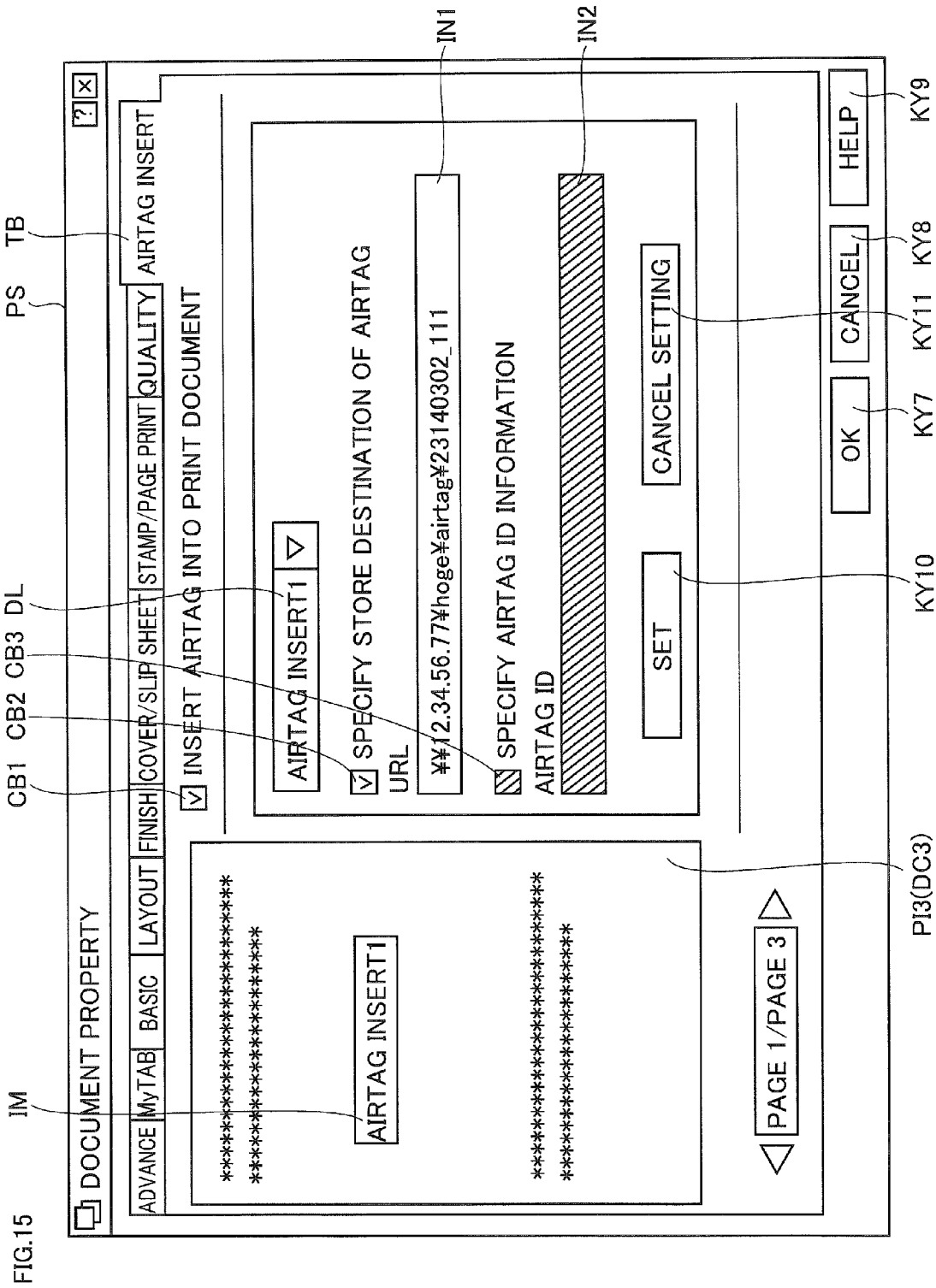
FIG. 15 schematically shows the setting screen for air tags displayed on display unit 360 by PC 300, according to the third behavior example of an air tag deliver system.

FIG. 15 schematically shows the setting screen for air tags displayed on display unit 360 by PC 300, according to the third behavior example of the air tag deliver system.

Referring to FIG. 15, it is assumed that a user using PC 300 displays document DC3 via document viewing software or the like. It is assumed that document DC3 is the document in which object OB1 was deleted from document DC1. Preview image PI3 of document DC3 is shown in FIG. 15.

When the user displays document DC3 on the document viewing software or the like using PC 300 and starts up a printer driver, image processing device 100 displays the print setting screen PS. The print setting screen is for receiving settings related to the print job of document DC3. The user of PC300 configures settings of the print job and instructs to perform the print job via the print setting screen. The print setting screen includes "OK" key KY7, "CANCEL" key KY8, and "HELP" key KY9.

When the "AIR TAG INSERT" tab TB in the print setting screen was selected, PC 300 displays a screen for specifying an air tag. The screen for specifying an air tag includes preview image PI3 of document DC3, drop down list DL, checkboxes CB1, CB2 and CB3, input areas IN1 and IN2, "SET" key KY10, and "CANCEL SETTING" key KY11.

When checkbox CB1 is checked, the insert location of the AR marker and the air tag will be specified.

Image IM is for indicating the insert location of the AR marker. The user moves image IM within preview image PI3 to place it at the desired location.

When checkbox CB2 is checked, image processing device 100 receives an input of the store destination of the specified air tag at input area IN1. In this instance, image processing device 100 does not accept inputs of checkbox CB3 and input area IN2. On the other hand, when checkbox CB3 is checked, image processing device 100 receives inputs of the air tag ID of the specified air tag at input area IN2. (The input of the air tag ID can be received, only when the air tag ID was issued at the time of the register of the air tag or the like.) In this instance, image processing device 100 does not receive inputs in checkbox CB2 and input area IN1.

The specifying method for an air tag is arbitrary. An air tag can be specified by the store destination of the air tag or the air tag ID. An air tag may be specified by key words related to the air tag, the registration time of the air tag, the genre of the air tag, or the like. When there are a plurality of candidates of air tags, air tag server 200 transmits these air tags to image processing device 100. Image processing device 100 may receive the air tag specified by the user of PC300 from among candidates of air tags.

When "SET" key KY10 is pressed, image processing device 100 receives the insert location of the AR marker and the air tag specified. When "CANCEL SETTING" key KY11 is pressed, image processing device 100 cancels the insert location of the AR marker and the air tag specified.

When "OK" key KY7 is pressed, image processing device 100 receives the instruction of performing the print job under the specified conditions. When "CANCEL" key KY8 is pressed, image processing device 100 receives cancel of settings of the print job. When "HELP" key KY9 is pressed, image processing device 100 receives a request of explanation of the print setting screen.

Figure 16:
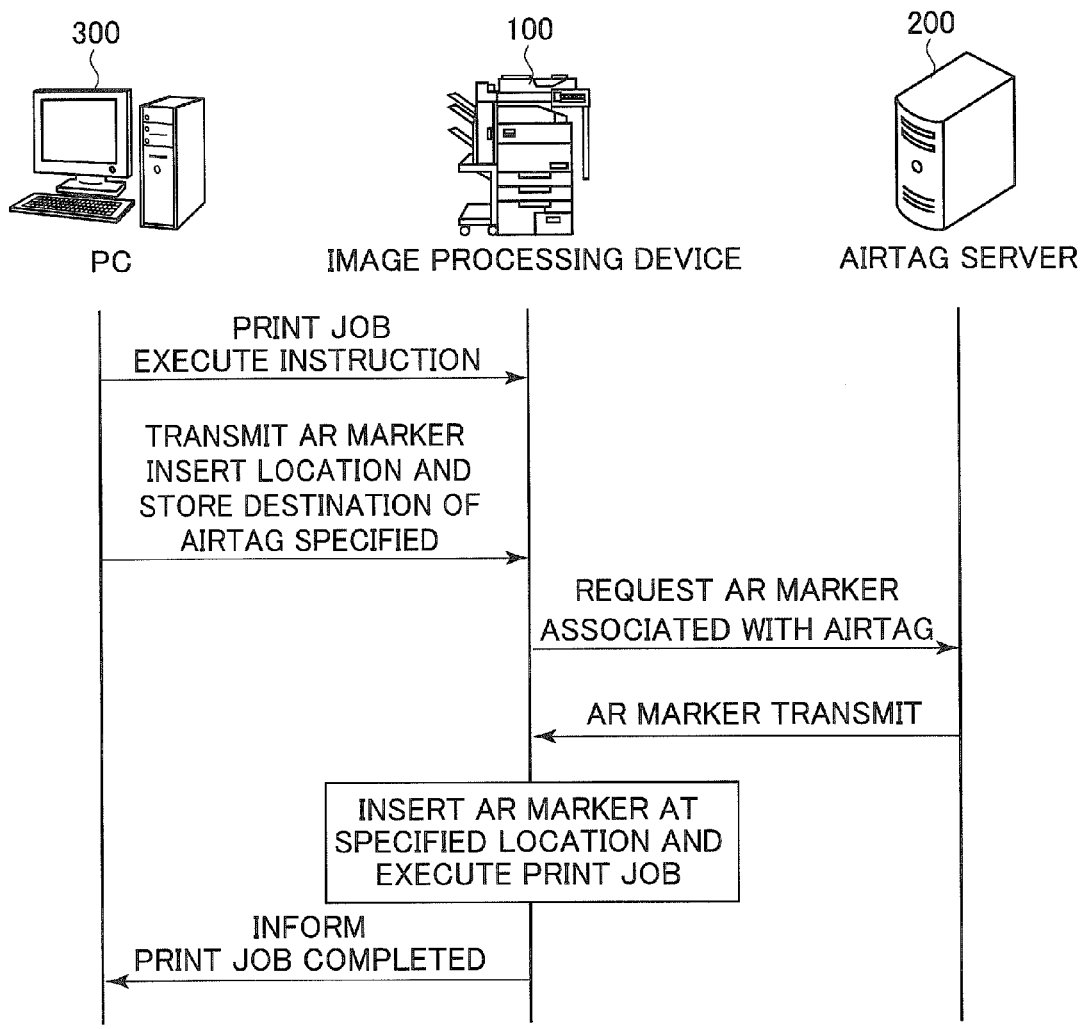
FIG. 16 shows a sequence diagram of the third behavior example of an air tag deliver system.

FIG. 16 shows a sequence diagram of the third behavior example of the air tag deliver system.

Referring to FIG. 16, a user of PC 300 instructs to execute a print job of documents via PC 300. Image processing device 100 receives the instruction of performing the print job via PC 300.

Image processing device 100 acquires document data for the print job from PC 300. Image processing device 100 receives information related to the insert location of the AR marker and the air tag specified (the store destination), in case that the print job includes information of settings of the air tag. Image processing device 100 identifies the air tag which is to be delivered based on the received information.

Next, image processing device 100 requests to transmit the AR marker associated with the specified air tag (the air tag which is to be delivered). Air tag server 200 transmits the corresponding AR marker to image processing device 100, in accordance with the request of image processing device 100.

Image processing device 100 inserts the received AR marker into the specified insert location, and executes the print job for the document after the insertion. After the completion of the print job, image processing device 100 informs PC 300 about the completion of the job.

In the third behavior example, a job which image processing device 100 receives may be a delivery job of scanned images of documents, or other jobs. Image processing device 100 displays information about the completion of the delivery job on operation panel 180, when image processing device 100 receives an execute instruction for the delivery job of scanned images of documents and the insert location of the AR marker specified via operation panel 180. Other than this point, the air tag deliver system performs behavior similar to the above.

The Effect of the Embodiment

According to the above embodiment, a user can execute a print job or a delivery job after a AR marker associated with the air tag which is to be delivered is inserted in the document, in case that the air tag which is to be delivered was registered in the air tag server. In consequence, the user save the effort of resetting of the deliver conditions of the air tag and the convenience is improved.

According to the first and the second behavior examples, an image processing device extracts objects from documents. The image processing device identifies the air tag which is to be delivered, based on the degree of coincidence between the extracted object and the registered air tag stored in an air tag server. Herewith, the user can save the effort of settings for the air tag which is to be delivered, and the convenience can be improved.

According to the first behavior example, the image processing device automatically extracts an object, and identifies the air tag which corresponds to the extracted object as the air tag which is to be delivered. Herewith, the user can save the effort of settings for the object extracted from documents, and the convenience can be improved.

According to the second behavior example, an image processing device extracts an object specified in an area of documents, and informs the air tag similar to the extracted object as the replacement candidate tag. This prevents the object in documents from being replaced with AR markers unintended by the user.

According to the third behavior example, an image processing device acquires information for specifying an air tag associated with the marker to be inserted.

The image processing device identifies the air tag which is to be delivered based on acquired information. Hence, the user easily inserts the air tag into the document, when the user has information of air tags to be delivered.

Others

The above mentioned first to third behavior examples of an air tag deliver system can be appropriately combined. For example, the first behavior example and the second behavior example can be combined. The second behavior example and the third behavior example can be combined. The third behavior example and the first behavior example can be combined. All the first to third behavior examples can be combined. When all the first to third behavior examples are combined, the image processing device may perform the following behavior, for example. When the image processing device receives an instruction of performing a job, the image processing device determines whether information of the insert location of the AR marker and the air tag specified is acquired or not. When the information was acquired, the image processing device performs in line with the third behavior example. When the information was not acquired, the image processing device determines whether the area where the object will be extracted in documents is specified or not. When the area where the object will be extracted in documents is specified, the image processing device performs in line with the second behavior example. When the area where the object will be extracted in documents is not specified, the image processing device performs in line with the first behavior example.

In case that software which can display an operation panel for operating the image processing device and operates the image processing device via the operation panel is installed in the portable terminal device, the image processing device may receive instructions of performing a job of the image processing device and various operations via the software of the portable terminal device.

According to this invention, an image processing device, a control method of an image processing device, and a control program of an image processing device which can improve convenience are provided.

The processes described in the above embodiments can be executed by software or a hardware circuit. A computer program which executes the processes in the above embodiments can be provided. The program may be provided recorded in recording media of CD-ROMs, flexible disks, hard disks, ROMs, RAM, memory cards, or the like to users. The program is executed by a computer of a CPU or the like.

The program may be downloaded to a device via communication lines like the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device which inserts a marker in a document comprising a processor, wherein the marker is for delivering a tag associated with the marker from a server to a terminal device when the terminal device which reads the marker satisfies a deliver condition, the processor is configured to:
- identify a tag to be delivered from among tags stored in the server;
- acquire a marker associated with the tag to be delivered from the server; and
- insert the acquired marker into the document.

2. The image processing device according to claim 1, wherein the processor is configured to:
- extract an object from the document;
- acquire the tag stored in the server;
- determine the degree of coincidence between the extracted object and the acquired tag;
- identify the tag to be delivered based on the determined degree of coincidence; and
- replace the extracted object with the acquired marker.

3. The image processing device according to claim 2, wherein the processor is configured to:
- identify the tag which corresponds to the object as the tag to be delivered.

4. The image processing device according to claim 2, wherein the processor is configured to:
- inform the tag which is similar to the object as the tag of a replacement candidate.

5. The image processing device according to claim 4, wherein the processor is configured to:
- receive a replacement instruction for the tag of the replacement candidate, in case that the tag of the replacement candidate is informed; and
- identify the tag of the replacement candidate as the tag to be delivered, in case that the replacement instruction is received.

6. The image processing device according to claim 2, wherein the processor is configured to:
- extract the object in a specified area in the document.

7. The image processing device according to claim 1, wherein the processor is configured to:
- acquire information of an insert location of the marker in the document and the specified tag associated with the marker to be inserted; and
- identify the tag to be delivered based on the acquired information.

8. A method of controlling an image processing device which inserts a marker in a document, wherein the marker is for delivering a tag associated with the marker from a server to a terminal device when the terminal device which reads the marker satisfies a deliver condition, the method comprising the steps of:
- identify a tag to be delivered from among tags stored in the server;
- acquire a marker associated with the tag to be delivered from the server; and
- insert the acquired marker into the document.

9. The method of controlling the image processing device according to claim 8, further comprising the steps of:
- extract an object from the document;
- acquire the tag stored in the server;
- determine the degree of coincidence between the extracted object and the acquired tag;
- identify the tag to be delivered based on the determined degree of coincidence; and
- replace the extracted object with the acquired marker.

10. The method of controlling the image processing device according to claim 9, further comprising the step of:
- identify the tag which corresponds to the object as the tag to be delivered.

11. The method of controlling the image processing device according to claim 9, further comprising the step of:
- inform the tag which is similar to the object as the tag of a replacement candidate.

12. The method of controlling the image processing device according to claim 11, further comprising the steps of:
- receive a replacement instruction for the tag of the replacement candidate, in case that the tag of the replacement candidate is informed; and
- identify the tag of the replacement candidate as the tag to be delivered, in case that the replacement instruction is received.

13. The method of controlling the image processing device according to claim 9, further comprising the step of:
- extract the object in a specified area in the document.

14. The method of controlling the image processing device according to claim 8, further comprising the steps of:
- acquire information of an insert location of the marker in the document and the specified tag associated with the marker to be inserted; and
- identify the tag to be delivered based on the acquired information.

15. A non-transitory computer-readable recording medium storing a controlling program for an image processing device which inserts a marker in a document, wherein the marker is for delivering a tag associated with the marker from a server to a terminal device when the terminal device which reads the marker satisfies a deliver condition, the program causing a computer to execute the steps of:
- identify a tag to be delivered from among tags stored in the server;
- acquire a marker associated with the tag to be delivered from the server; and
- insert the acquired marker into the document.

16. The non-transitory computer-readable recording medium according to claim 15, causing a computer to execute processing the steps of:
- extract an object from the document;
- acquire the tag stored in the server;
- determine the degree of coincidence between the extracted object and the acquired tag;
- identify the tag to be delivered based on the determined degree of coincidence; and
- replace the extracted object with the acquired marker.

17. The non-transitory computer-readable recording medium according to claim 16, causing a computer to execute processing the step of:
- identify the tag which corresponds to the object as the tag to be delivered.

18. The non-transitory computer-readable recording medium according to claim 16, causing a computer to execute processing the step of:
- inform the tag which is similar to the object as the tag of a replacement candidate.

19. The non-transitory computer-readable recording medium according to claim 18, causing a computer to execute processing the steps of:
- receive a replacement instruction for the tag of the replacement candidate, in case that the tag of the replacement candidate is informed; and
- identify the tag of the replacement candidate as the tag to be delivered, in case that the replacement instruction is received.

20. The non-transitory computer-readable recording medium according to claim 16, causing a computer to execute processing the step of:

extract the object in a specified area in the document.

21. The non-transitory computer-readable recording medium according to claim 15, causing a computer to execute processing the steps of:

acquire information of an insert location of the marker in the document and the specified tag associated with the marker to be inserted; and identify the tag to be delivered based on the acquired information.

\* \* \* \* \*